United States Patent
Ono et al.

(10) Patent No.: US 11,539,227 B2
(45) Date of Patent: Dec. 27, 2022

(54) CHARGE/DISCHARGE CONTROL CIRCUIT AND BATTERY DEVICE

(71) Applicant: ABLIC Inc., Tokyo (JP)

(72) Inventors: Takashi Ono, Tokyo (JP); Ryoichi Anzai, Tokyo (JP)

(73) Assignee: ABLIC INC., Tokyo (JP)

( * ) Notice: Subject to any disclaimer, the term of this patent is extended or adjusted under 35 U.S.C. 154(b) by 58 days.

(21) Appl. No.: 17/159,478

(22) Filed: Jan. 27, 2021

(65) Prior Publication Data

US 2021/0249869 A1  Aug. 12, 2021

(30) Foreign Application Priority Data

Feb. 7, 2020 (JP) .............................. JP2020-019600

(51) Int. Cl.
*H02J 7/00* (2006.01)

(52) U.S. Cl.
CPC ............ *H02J 7/007* (2013.01); *H02J 7/0029* (2013.01); *H02J 7/0034* (2013.01); *H02J 7/0047* (2013.01); *H02J 7/00712* (2020.01); *H02J 2207/20* (2020.01)

(58) Field of Classification Search
CPC ........ H02J 7/007; H02J 7/0047; H02J 7/0029; H02J 7/0034; H02J 7/00712; H02J 2207/20
USPC ......................................... 320/134, 158, 163
See application file for complete search history.

(56) References Cited

U.S. PATENT DOCUMENTS

2018/0331093 A1* 11/2018 Takahashi ........... H01L 27/0255
2019/0027945 A1*  1/2019 Gagnon ............... H02H 11/003

FOREIGN PATENT DOCUMENTS

JP         H11-178224 A        7/1999

* cited by examiner

*Primary Examiner* — Edward Tso
*Assistant Examiner* — Aaron Piggush
(74) *Attorney, Agent, or Firm* — Crowell & Moring LLP

(57) ABSTRACT

Provided is a technology capable of protecting a charge/discharge control circuit and a battery device from a reverse connection state without a separately provided protection circuit. The charge/discharge control circuit to be contained in a battery device including a secondary cell, an external positive terminal and an external negative terminal, and FETs which control charging and discharging of the secondary cell, respectively, includes: VDD and VSS terminals; a charge control terminal; a discharge control terminal; a voltage detection terminal to which a voltage applied to the external positive terminal is supplied; an NMOS transistor communicates the discharge control terminal and the voltage detection terminal; and a bipolar transistor having a collector to be connected to a drain of the NMOS transistor, an emitter to be connected to a source of the NMOS transistor, and a base to be connected to a bulk of the NMOS transistor and the VSS terminal.

13 Claims, 5 Drawing Sheets

US 11,539,227 B2

CHARGE/DISCHARGE CONTROL CIRCUIT AND BATTERY DEVICE

RELATED APPLICATIONS

This application claims priority to Japanese Patent Application No. 2020-019600, filed on Feb. 7, 2020, the entire content of which is incorporated herein by reference.

BACKGROUND OF THE INVENTION

1. Field of the Invention

The present invention relates to a charge/discharge control circuit and a battery device.

2. Description of the Related Art

A battery device includes a secondary cell and a charge/discharge control device which includes a charge/discharge control circuit configured to control charging/discharging of the secondary cell. The charge/discharge control device detects over-charging and over-discharging of the secondary cell as well as a discharge overcurrent and a charge overcurrent, and controls the charging/discharging of the secondary cell based on the result of the detection. The battery device protects the secondary cell from over-charging, over-discharging, a discharge overcurrent, and a charge overcurrent by controlling the charging/discharging of the secondary cell with the charge/discharge control device.

However, the battery device of the related art disclosed in Japanese Patent Application Laid-open No. Hei 11-178224 is not designed in consideration of a "reverse connection state." The reverse connection state is a state in which a charger is connected to an external positive terminal and an external negative terminal with the polarity of the charger being reversed.

To give a specific description, under a state in which a charger is connected by reverse connection to an external positive terminal and an external negative terminal, a reverse voltage of the charger is applied to the external positive terminal and the external negative terminal. A voltage that is the sum of the voltage of the charger and a voltage of the secondary cell is accordingly applied between a positive pole of the secondary cell and the external positive terminal. As a result, an excessively large current exceeding a rated current flows into charge/discharge control MOS transistors provided between the positive pole of the secondary cell and the external positive terminal, and the charge/discharge control circuit and the battery device may be damaged.

Meanwhile, a protection function against reverse connection of the charger can be added to the battery device disclosed in Japanese Patent Application Laid-open No. Hei 11-178224 by separately providing a protection circuit configured to protect the battery device. However, the addition of a separate protection circuit leads to an increase in device size.

SUMMARY OF THE INVENTION

The present invention has been made in view of the circumstances described above, and an object of the present inventions is therefore to provide a charge/discharge control circuit and a battery device with which the battery device can be protected from a reverse connection state without a separately provided protection circuit.

According to one aspect of the present invention, there is provided a charge/discharge control circuit to be contained in a battery device including a secondary cell, an external positive terminal and an external negative terminal to which a load, a positive pole of a charger, and a negative pole of the charger are connectable, a charge control FET configured to control charging of the secondary cell, and a discharge control FET configured to control discharging of the secondary cell, the charge/discharge control circuit including: a first power supply voltage input terminal to which, out of a first power supply voltage and a second power supply voltage, the first power supply voltage is input, the first power supply voltage and the second power supply voltage being generated by the secondary cell; a second power supply voltage input terminal to which the second power supply voltage lower than the first power supply voltage is input; a charge control terminal to be connected to a gate of the charge control FET; a discharge control terminal to be connected to a gate of the discharge control FET; a voltage detection terminal to which a voltage applied to the external positive terminal is input; an NMOS transistor configured to communicate the discharge control terminal and the voltage detection terminal; and a bipolar transistor having a collector to be connected to a drain of the NMOS transistor, an emitter to be connected to a source of the NMOS transistor, and a base to be connected to a bulk of the NMOS transistor and the second power supply voltage input terminal.

According to another aspect of the present invention, there is provided a battery device including: the above-mentioned charge/discharge control circuit; the secondary cell; the external negative terminal; the external positive terminal; and the charge control FET and the discharge control FET which are to be connected between a positive pole of the secondary cell and the external positive terminal.

According to the charge/discharge control circuit and the battery device, the battery device can be protected from the reverse connection state without the separately provided protection circuit.

DETAILED DESCRIPTION OF THE PREFERRED EMBODIMENTS

First Embodiment

Figure 1:
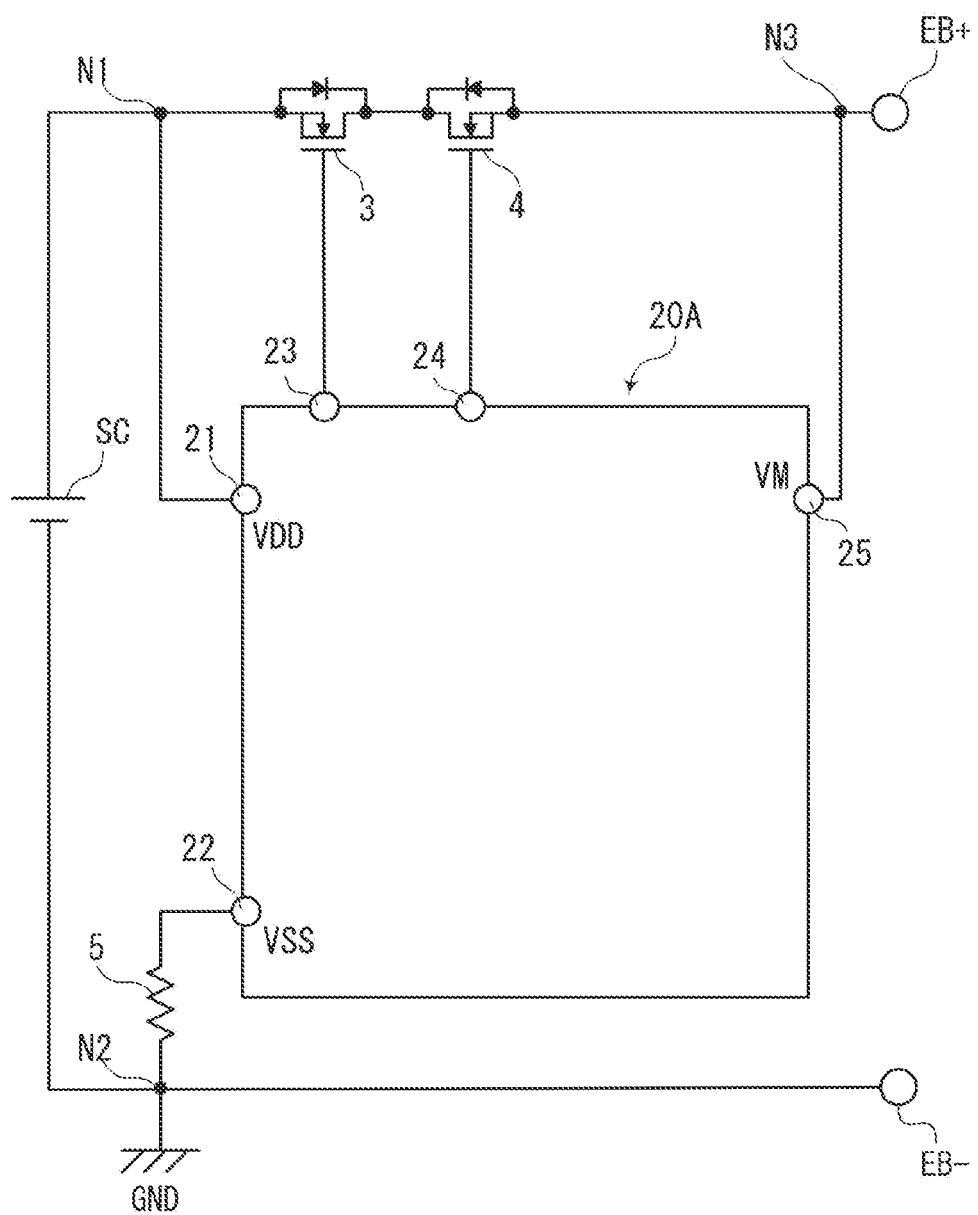
FIG. 1 is a circuit diagram for schematically illustrating a configuration example of a battery device according to a first embodiment of the present invention.

FIG. 1 is a circuit diagram for illustrating a configuration example of a battery device according to a first embodiment of the present invention. A battery device 1A is an example of the battery device according to the first embodiment, and a charge/discharge control circuit 20A is an example of a charge/discharge control circuit according to the first embodiment.

The battery device 1A includes the charge/discharge control circuit 20A, a secondary cell SC, N-type MOS transistors (hereinafter referred to as "NMOS transistors") 3 and 4, an external positive terminal EB+, and an external negative terminal EB−.

The charge/discharge control circuit 20A includes a VDD terminal 21 as a first power supply voltage input terminal, a VSS terminal 22 as a second power supply voltage input terminal, a charge control terminal 23, a discharge control terminal 24, and a voltage detection terminal 25.

The VDD terminal 21 is a terminal to which a voltage VDD as a first power supply voltage is input. The VDD terminal 21 is connected to a positive pole of the secondary cell SC and a source of the NMOS transistor 3. A connection point at which the positive pole of the secondary cell SC, the source of the NMOS transistor 3, and the VDD terminal 21 are connected forms a node N1.

Figure 2:
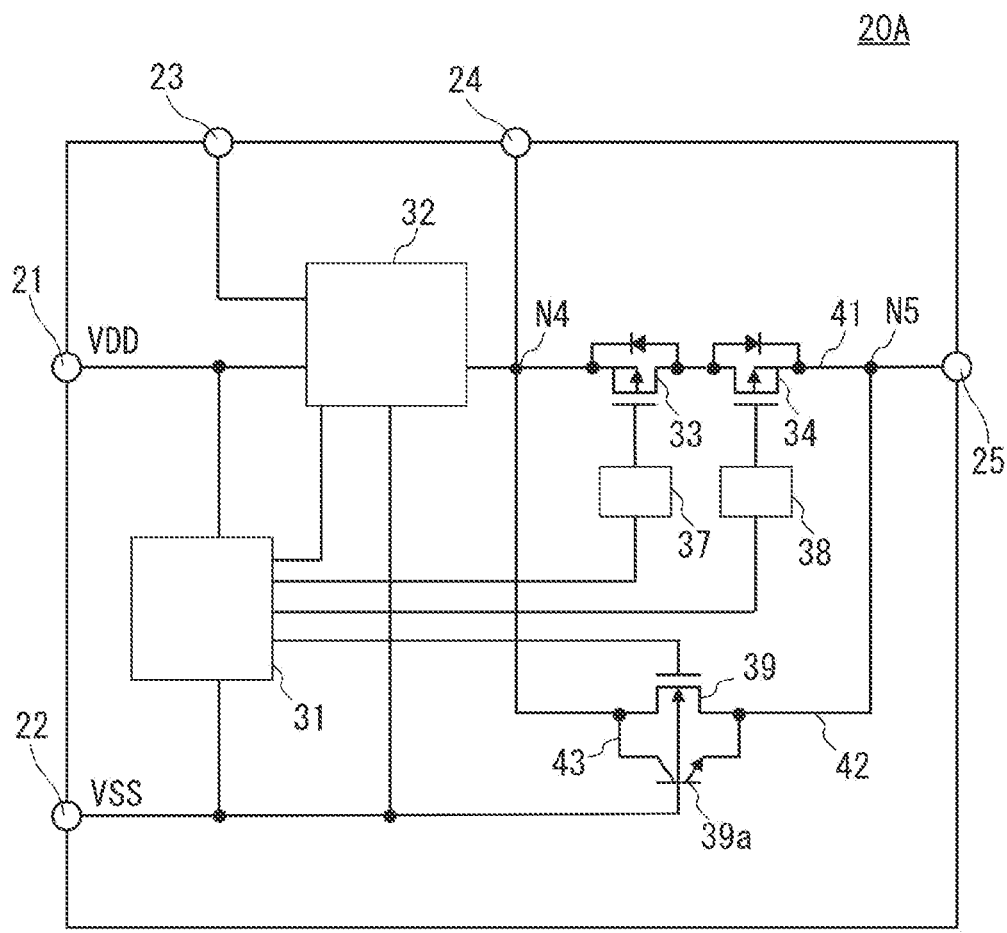
FIG. 2 is a circuit diagram for schematically illustrating a configuration example of a charge/discharge control circuit according to the first embodiment.

The VSS terminal 22 is a terminal to which a voltage VSS as a second power supply voltage is input. The VSS terminal 22 is connected to a ground terminal GND via a resistor 5. One end of the resistor 5 is connected to the external negative terminal EB− and a negative pole of the secondary cell SC. A connection point at which the one end of the resistor 5, the external negative terminal EB−, and the negative pole of the secondary cell SC are connected forms a node N2. The resistor 5 has a function of limiting a current that is generated, as described later, in a reverse connection state and flows from the VSS terminal 22 to the voltage detection terminal 25 via a base-emitter diode of a parasitic bipolar transistor 39a (FIG. 2 referred to later).

The NMOS transistor 3 as a charge control field effect transistor (FET) has a gate to be connected to the charge control terminal 23, the source to be connected to the positive pole of the secondary cell SC and the VDD terminal 21, and a drain, and is configured to control the charging of the secondary cell SC.

The NMOS transistor 4 as a discharge control FET has a gate to be connected to the discharge control terminal 24, a drain to be connected to the drain of the NMOS transistor 3, and a source to form a short circuit with the voltage detection terminal 25, and is configured to control the discharging of the secondary cell SC. A connection point at which the source of the NMOS transistor 4 and the voltage detection terminal 25 are connected forms a node N3.

The external positive terminal EB+ is configured to be connectable to a load and a positive pole of a charger. The external positive terminal EB+ is connected to the node N3. The external negative terminal EB− is configured to be connectable to a load and a negative pole of the charger. The external negative terminal EB− is connected to the node N2.

FIG. 2 is a circuit diagram for illustrating a more specific configuration of the charge/discharge control circuit 20A.

The charge/discharge control circuit 20A includes, the VDD terminal 21, the VSS terminal 22, the charge control terminal 23, the discharge control terminal 24, and the voltage detection terminal 25, a control circuit 31, a booster circuit 32, P-type MOS transistors (hereinafter referred to as "PMOS transistors") 33 and 34, level shifters 37 and 38, an NMOS transistor 39, and the parasitic bipolar transistor 39a.

The control circuit 31 is connected between the VDD terminal 21 and the VSS terminal 22. The control circuit 31 is connected to the booster circuit 32, to gates of the PMOS transistors 33 and 34 via the level shifters 37 and 38, respectively, and to a gate of the NMOS transistor 39. The control circuit 31 is configured to control an on level and off level of an output voltage from the booster circuit 32, the turning on and off of the PMOS transistors 33 and 34, and the turning on and off of the NMOS transistor 39.

The booster circuit 32 is connected between the VDD terminal 21 and the VSS terminal 22, and is configured so as to be capable of generating a voltage higher than the voltage VDD. In the charge/discharge control circuit 20A, the booster circuit 32 has, as a plurality of output terminals from which the generated voltage is output, at least an output terminal (hereinafter, referred to as "first output terminal") to be connected to the charge control terminal 23 and an output terminal (hereinafter, referred to as "second output terminal") to be connected to the discharge control terminal 24. The booster circuit 32 has a control terminal to be connected to the control circuit 31. The on level and off level of the output voltage from the booster circuit 32 are controlled for each output terminal of the booster circuit 32, based on a control signal input from the control terminal.

The PMOS transistors 33 and 34 each include a parasitic diode having a direction that runs from a drain toward a source as a forward direction, and the drains of the PMOS transistors 33 and 34 are connected to each other. The source of the PMOS transistor 33 is connected to the discharge control terminal 24, the second output terminal of the booster circuit 32, and a drain of the NMOS transistor 39. A connection point thereof forms a node N4. The gate of the PMOS transistor 33 is connected to the control circuit 31 via the level shifter 37.

The source of the PMOS transistor 34 is connected to a source of the NMOS transistor 39 and the voltage detection terminal 25. A connection point thereof forms a node N5. The gate of the PMOS transistor 34 is connected to the control circuit 31 via the level shifter 38.

The PMOS transistors 33 and 34 form a path 41 which communicates the node N4 and the node N5, that is, the discharge control terminal 24 and the voltage detection terminal 25.

The NMOS transistor 39 forms a path 42 which communicates the discharge control terminal 24 and the voltage detection terminal 25 by a route different from the path 41. The NMOS transistor 39 includes, between the drain and source of the NMOS transistor 39, the parasitic bipolar transistor 39a connected in parallel to the NMOS transistor 39.

The parasitic bipolar transistor 39a as a bipolar transistor has a collector and an emitter which are connected to the drain and source of the NMOS transistor 39, respectively, and a base connected to the VSS terminal 22. The base of the parasitic bipolar transistor 39a is also connected to a bulk of the NMOS transistor 39 as described later.

Thus, the charge/discharge control circuit 20A has, between the discharge control terminal 24 and the voltage detection terminal 25, the path 41, the path 42, and a path 43. The path 41 is a path communicated by the PMOS transistors 33 and 34. The path 42 is a path communicated through the NMOS transistor 39. The path 43 is a path communicated through the parasitic bipolar transistor 39a.

Figure 3:
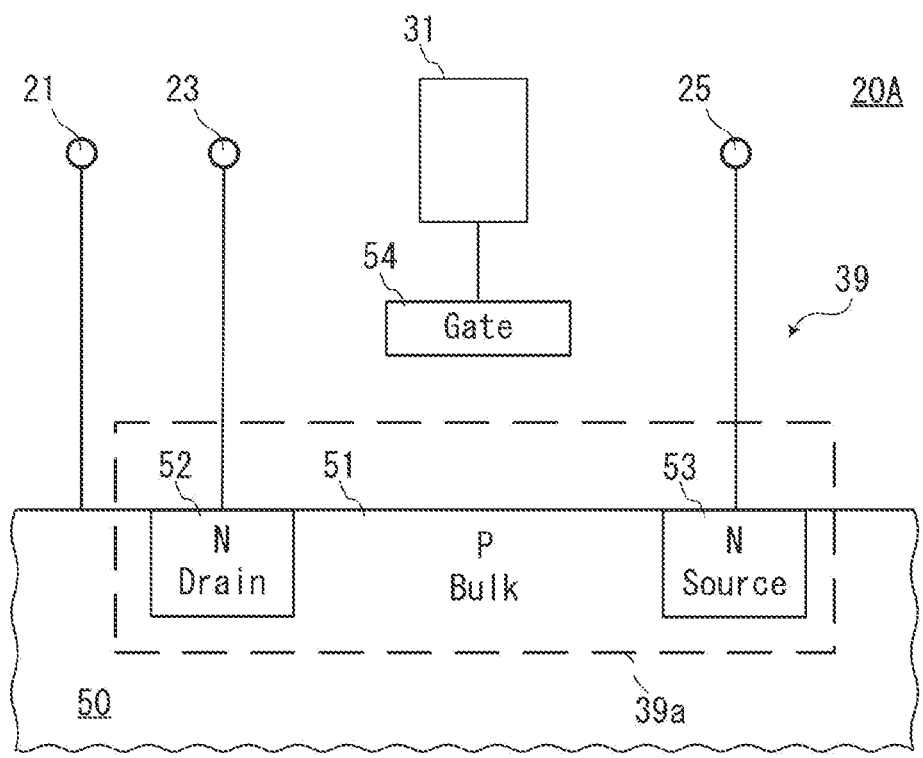
FIG. 3 is a structural diagram for schematically illustrating a partial cross-section of the charge/discharge control circuit according to the first embodiment.

FIG. 3 is a structural diagram for schematically illustrating a partial cross-section of the charge/discharge control circuit 20A.

Figure 4:
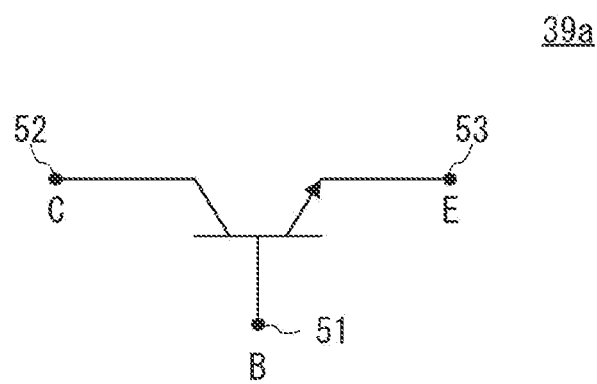
FIG. 4 is a schematic diagram for illustrating a relationship between an NMOS transistor to be employed in the charge/discharge control circuit according to the first embodiment and a parasitic bipolar transistor parasitizing the NMOS transistor.

FIG. 4 is a schematic diagram for illustrating a relationship between the NMOS transistor 39 employed in the charge/discharge control circuit 20A and the parasitic bipolar transistor 39a parasitizing the NMOS transistor 39.

The charge/discharge control circuit 20A is formed on, for example, a P-type semiconductor substrate 50. On the semiconductor substrate 50, N-type regions 52 and 53 are formed inside a substrate region 51 which is a P-type region. A gate 54 is also formed on the semiconductor substrate 50 with an insulating layer (not illustrated) being interposed therebetween.

The substrate region 51, the N-type region 52, the N-type region 53, and the gate 54 form the terminals of the NMOS transistor 39. That is, the NMOS transistor 39 having the bulk which is the substrate region 51, the drain which is the N-type region 52, the source which is the N-type region 53, and the gate 54 is formed on the semiconductor substrate 50.

Further, the parasitic bipolar transistor 39a having the base, the collector, and the emitter formed of the substrate region 51, the N-type region 52, and the N-type region 53, respectively, is formed in the NMOS transistor 39.

Next, action (operation) and effects of the charge/discharge control circuit and battery device according to the first embodiment are described taking the charge/discharge control circuit 20A and the battery device 1A as an example.

In the charge/discharge control circuit 20A, output voltages controlled to be at the on level or the off level for each output terminal by the control circuit 31 are supplied from the booster circuit 32 to the charge control terminal 23 and the discharge control terminal 24. A voltage supplied to the charge control terminal 23 is supplied to the gate of the NMOS transistor 3. A voltage supplied to the discharge control terminal 24 is supplied to the gate of the NMOS transistor 4. The control circuit 31 controls the turning on and off of the NMOS transistors 3 and 4 by controlling each output voltage from the booster circuit 32 so that the output voltage is at the on level or the off level.

The battery device 1A in a normal connection state in which a charger CH or a load is correctly connected to the external positive terminal EB+ and the external negative terminal EB− shifts between (1) a normal state, (2) an over-charging state, (3) an over-discharging state, (4) a charge overcurrent state, and (5) a discharge overcurrent state. The term "normal state" as used herein means a state that is none of the over-charging state, the over-discharging state, the charge overcurrent state, and the discharge overcurrent state.

(1) In the normal state, the NMOS transistor 3 and the NMOS transistor 4 are both turned on. Charging from the charger CH and discharging to the load are freely executed in the normal state.

(2) The over-charging state is a state in which the voltage of the secondary cell SC exceeds an over-charging detection voltage. If a state of the battery device 1A shifts from the normal state to the over-charging state by rising of the voltage of the secondary cell SC and keeping of exceeding the over-charging detection voltage for a set length of time, the charge/discharge control circuit 20A turns the NMOS transistor 3 off from the standpoint of protecting the secondary cell SC. The NMOS transistor 4 is kept turned on even in the over-charging state from the standpoint of maintaining a dischargeable state. If the voltage of the secondary cell SC drops to a range below an over-charging cancellation voltage by discharging, the battery device 1A shifts from the over-charging state to the normal state. With the shift to the normal state, the charge/discharge control circuit 20A turns the NMOS transistor 3 on.

(3) The over-discharging state is a state in which the voltage of the secondary cell SC falls below an over-discharging detection voltage by discharging. If a state of the battery device 1A shifts from the normal state to the over-charging state by dropping of the voltage of the secondary cell SC and keeping below the over-discharging detection voltage for a set length of time, the charge/discharge control circuit 20A turns the NMOS transistor 4 off from the standpoint of preventing the secondary cell SC from being drained. The NMOS transistor 3 is kept turned on even in the over-discharging state from the standpoint of maintaining a chargeable state. If the voltage of the secondary cell SC exceeds an over-discharging cancellation voltage by charging with the charger CH, the battery device 1A shifts to the normal state. With the shift to the normal state, the charge/discharge control circuit 20A turns the NMOS transistor 4 on.

(4) The charge overcurrent state is a state in which a charge overcurrent is kept detected for a set length of time. If a state of the battery device 1A shifts from the normal state to the charge overcurrent state by keeping detection of a charge overcurrent for the set length of time from the normal state, the charge/discharge control circuit 20A turns the NMOS transistor 3 off from the standpoint of protecting the NMOS transistor 3 and the NMOS transistor 4. If no detection of the charge overcurrent is maintained even after a detection cancellation time, the battery device 1A shifts from the charge overcurrent state to the normal state. With the shift to the normal state, the charge/discharge control circuit 20A turns the NMOS transistor 3 on.

(5) The discharge overcurrent state is a state in which a discharge overcurrent is kept detected for a set length of time. If a state of the battery device 1A shifts from the normal state to the charge overcurrent state by keeping detection of a discharge overcurrent for the set length of time from the normal state, the charge/discharge control circuit 20A turns the NMOS transistor 4 off from the standpoint of protecting the NMOS transistor 3 and the NMOS transistor 4. If no detection of the discharge overcurrent is maintained even after the detection cancellation time, the battery device 1A shifts from the discharge overcurrent state to the normal state. With the shift to the normal state, the charge/discharge control circuit 20A turns the NMOS transistor 4 on.

In the charge/discharge control circuit 20A in the normal connection state, a voltage VM changes from 0 V or higher to a voltage VCH (V) of the charger CH or lower. That is, the voltage VM satisfies 0≤VM≤VCH. In the over-discharging state and the discharge overcurrent state, the control circuit 31 controls a gate voltage of the NMOS transistor 39 and controls gate voltages of the PMOS transistors 33 and 34 via the level shifters 37 and 38, respectively, in order to stop discharging from the secondary cell SC.

Through the control of the gate voltages of the PMOS transistors 33 and 34 and the NMOS transistor 39 described above, the battery device 1A in the normal connection state operates so that the node N4 and the node N5 are connected to each other via at least the PMOS transistors 33 and 34 or at least the NMOS transistor 39 out of the PMOS transistors 33 and 34 and the NMOS transistor 39. In other words, the gate voltages of the PMOS transistors 33 and 34 and the NMOS transistor 39 are controlled so as not to cause disconnection of the path 41 and disconnection of the path 42 at the same time.

To describe with the use of a threshold voltage VTHP of the PMOS transistors 33 and 34, a threshold voltage VTHN of the NMOS transistor 39, the voltage VDD, and the voltage VSS, the NMOS transistor 39 is turned on in a range in which the voltage VM is less than a voltage obtained by subtracting from the voltage VDD the threshold voltage VTHN (VM<VDD−VTHN). In the normal connection state, a lower limit of the voltage VM is 0 V (0≤VM≤VDD−VTHN).

The PMOS transistors 33 and 34 are turned on in a range in which the voltage VM exceeds a voltage obtained by adding the voltage VSS and the threshold voltage VTHP and is equal to or less than the voltage VCH (VSS+VTHP<VM≤VCH). The discharge control terminal 24 and the voltage detection terminal 25 are thus connected to each other via the path 41 and the path 42 which enable switching between connection and disconnection of the terminals based on how high or low the voltage VM is. The voltage of the discharge control terminal 24 is accordingly equal to the voltage VM in the normal connection state (0≤VM≤VCH).

A reverse connection state of the battery device 1A is subsequently described. The reverse connection state is a state in which the charger CH is connected to the external positive terminal EB+ and the external negative terminal EB− with the polarity of the charger CH being reversed (with the positive and negative polarity sides being reversed), that is, the charger CH is connected by reverse connection.

Figure 5:
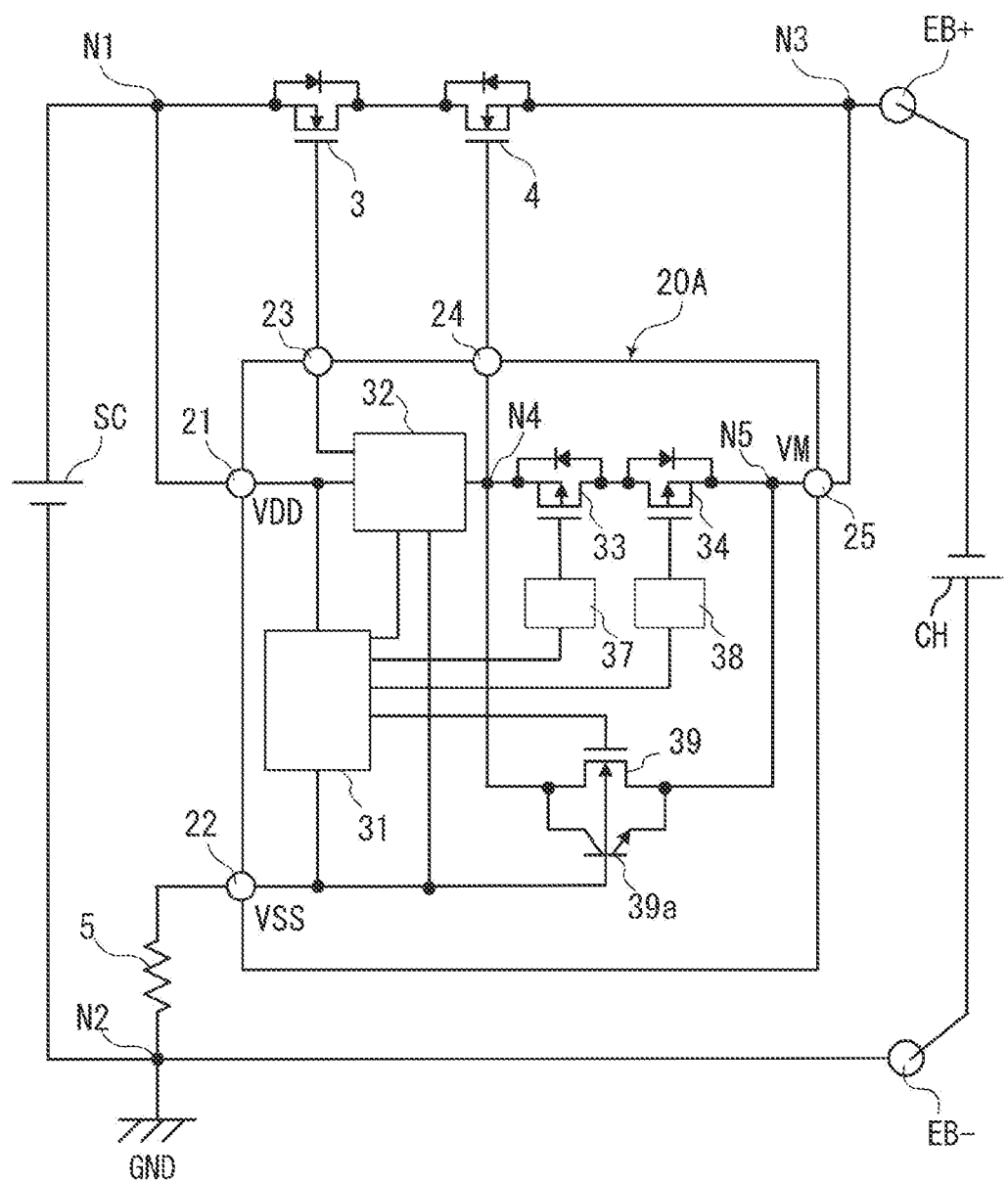
FIG. 5 is a circuit diagram for illustrating a state in which a charger is connected by reverse connection in the battery device according to the first embodiment.

FIG. 5 is a circuit diagram for illustrating the battery device 1A in the reverse connection state. In FIG. 5, some of the reference symbols found in FIG. 2 are omitted from the standpoint of ensuring the clarity of the drawing.

In a state where the charger CH is connected by reverse connection to the external positive terminal EB+and the external negative terminal EB−, the circuit state of the battery device 1A shifts to (6) a reverse connection state. In the reverse connection state, the voltage VM of the voltage detection terminal 25 is −VCH (<0 V), and is lower than the voltage VSS of the VSS terminal 22.

(6) In the reverse connection state, there may be a case where a voltage equal to or more than a forward direction voltage of the base-emitter diode of the parasitic bipolar transistor 39a is applied between the voltage detection terminal 25 and the VSS terminal 22, the parasitic bipolar transistor 39a is turned on. With the turning on of the parasitic bipolar transistor 39a, electrical connection is established between the discharge control terminal 24 and the voltage detection terminal 25. The establishment of electrical connection between the discharge control terminal 24 and the voltage detection terminal 25 sets a gate-source voltage of the NMOS transistor 4 to 0 V, and the NMOS transistor 4 is accordingly turned off.

In the battery device 1A, the NMOS transistor 4 is thus switched to an off-state with a voltage equal to or more than the forward direction voltage of the base-emitter diode of the parasitic bipolar transistor 39a being applied between the voltage detection terminal 25 and the VSS terminal 22. This enables the battery device 1A to protect the NMOS transistors 3 and 4 from an excessively large current generated by the charger CH that is connected by reverse connection.

According to the charge/discharge control circuit 20A and the battery device 1A, the NMOS transistor 3 and the NMOS transistor 4 can be protected from an excessively large current generated in the reverse connection state without a protection circuit being separately provided outside the charge/discharge control circuit 20A.

In the charge/discharge control circuit 20A and the battery device 1A, a configuration with which the battery device 1A can be protected from the reverse connection state is formed by the NMOS transistor 39 and the parasitic bipolar transistor 39a. The NMOS transistor 39 and the parasitic bipolar transistor 39a can be formed on the same semiconductor substrate 50, and the configuration with which the battery device 1A can be protected from the reverse connection state can be provided in a space smaller than in the related art.

The charge/discharge control circuit 20A that also includes components other than the NMOS transistor 39 and the parasitic bipolar transistor 39a can be formed on the semiconductor substrate 50. The charge/discharge control circuit 20A can therefore be formed on a single semiconductor substrate, and an increase in size of the charge/discharge control circuit 20A and the battery device 1A can be consequently minimized.

Second Embodiment

Figure 6:
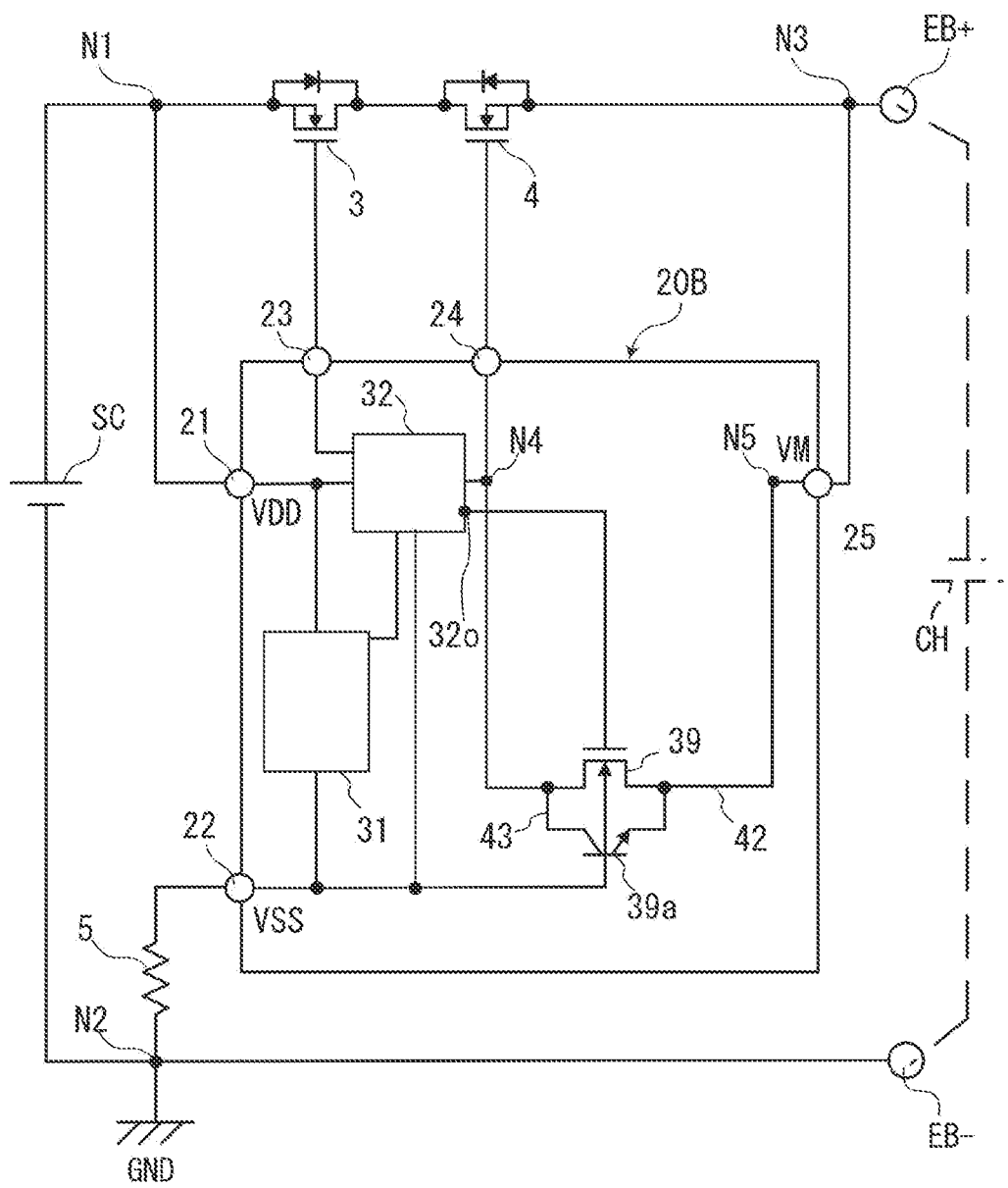
FIG. 6 is a circuit diagram for schematically illustrating a configuration example of a battery device and charge/discharge control circuit according to a second embodiment of the present invention.

FIG. 6 is a circuit diagram for illustrating a charge/discharge control circuit 20B and a battery device 1B which are an example of a charge/discharge control circuit and battery device according to a second embodiment of the present invention.

The battery device 1B includes the charge/discharge control circuit 20B in place of the charge/discharge control circuit 20A of the battery device 1A. The charge/discharge control circuit 20B differs from the charge/discharge control circuit 20A in that the PMOS transistors 33 and 34 and the level shifters 37 and 38 are omitted, and in that the gate of the NMOS transistor 39 is connected not to the control circuit 31 but to the booster circuit 32. Other configuration of the charge/discharge control circuit 20B is not substantially different from the charge/discharge control circuit 20A.

The differences from the charge/discharge control circuit 20A and the battery device 1A are therefore mainly described in the second embodiment. Components that have substantially no difference from those of the charge/discharge control circuit 20A and the battery device 1A are denoted by the same reference symbols, and descriptions that overlap with the ones given in the first embodiment are omitted.

As compared to the charge/discharge control circuit 20A, in the charge/discharge control circuit 20B, the PMOS transistors 33 and 34 which connect the node N4 and the node N5 to each other, the level shifter 37 which is connected to the gate of the PMOS transistor 33, and the level shifter 38 which is connected to the gate of the PMOS transistor 34, are omitted. That is, the charge/discharge control circuit 20B includes the VDD terminal 21, the VSS terminal 22, the charge control terminal 23, the discharge control terminal 24, and the voltage detection terminal 25, as well as the control circuit 31, the booster circuit 32, the NMOS transistor 39, and the parasitic bipolar transistor 39a.

The booster circuit 32 has a plurality of output terminals from which a voltage higher than the voltage VDD can be output by boosting the applied voltage VDD. The output terminals include, at least, an output terminal to be connected to the charge control terminal 23, an output terminal to be connected to the discharge control terminal 24, and an output terminal 32o to be connected to the gate of the NMOS transistor 39.

The drain of the NMOS transistor 39 is connected to the discharge control terminal 24 and the output terminal of the booster circuit 32 that is connected to the discharge control terminal 24. A connection point thereof forms the node N4. The source of the NMOS transistor 39 is connected to the voltage detection terminal 25. A connection point thereof forms the node N5.

Thus, the charge/discharge control circuit 20B has, between the discharge control terminal 24 and the voltage detection terminal 25, as paths communicating the two, the path 42 formed by the NMOS transistor 39 and the path 43 formed by the parasitic bipolar transistor 39a.

Next, action (operation) and effects of the charge/discharge control circuit and battery device according to the second embodiment are described taking the charge/discharge control circuit 20B and the battery device 1B as an example.

In the charge/discharge control circuit 20B and the battery device 1B, under a state in which discharging is to be stopped, the gate voltage of the NMOS transistor 39 is controlled by the booster circuit 32 so that the node N4 and the node N5 are connected to each other via the NMOS transistor 39.

Specifically, in the charge/discharge control circuit 20B and the battery device 1B, a voltage applied to the gate of the NMOS transistor 39, namely, a voltage output from the output terminal 32o, is set so as to be higher than a voltage obtained by adding the voltage VM and the threshold voltage VTHN of the NMOS transistor 39.

In the normal connection state, as in the battery device 1A, the battery device 1B shifts between: (1) the normal state; (2) the over-charging state; (3) the over-discharging state; (4) the charge overcurrent state; and (5) the discharge overcurrent state. The operation of the battery device 1B in (1) the normal state to (5) the discharge overcurrent state described above is the same as that of the battery device 1A; (6) in the reverse connection state in which the charger CH is connected by reverse connection (connection state of the charger CH that is indicated by the broken line in FIG. 6), the action of the battery device 1B and the charge/discharge control circuit 20B is the same as that of the battery device 1A and the charge/discharge control circuit 20A.

In the reverse connection state, there may be a case where a voltage equal to or more than the forward direction voltage of the base-emitter diode of the parasitic bipolar transistor 39a is applied between the voltage detection terminal 25 and the VSS terminal 22. In this case, the parasitic bipolar transistor 39a is turned on. With the turning on of the parasitic bipolar transistor 39a, the gate-source voltage of the NMOS transistor 4 is set to 0 V, and the NMOS transistor 4 is accordingly turned off.

In the battery device 1B, the NMOS transistor 4 is thus switched to an off-state with a voltage equal to or more than the forward direction voltage of the base-emitter diode of the parasitic bipolar transistor 39a being applied between the voltage detection terminal 25 and the VSS terminal 22. This enables the battery device 1B to protect the NMOS transistors 3 and 4 from an excessively large current generated by the charger CH that is connected by a reverse connection.

As described above, the charge/discharge control circuit 20B and the battery device 1B have, similarly to the charge/discharge control circuit 20A and the battery device 1A, a configuration with which the charge/discharge control circuit 20B can protect the battery device 1B from the reverse connection state, namely, the NMOS transistor 39 and the parasitic bipolar transistor 39a. The action of the charge/discharge control circuit 20B and the battery device 1B is the same as that of the charge/discharge control circuit 20A and the battery device 1A.

Thus, as in the charge/discharge control circuit 20A and the battery device 1A, according to the charge/discharge control circuit 20B and the battery device 1B, the NMOS transistor 3 and the NMOS transistor 4 can be protected without a protection circuit being separately provided outside the charge/discharge control circuit 20B.

In the charge/discharge control circuit 20B, the NMOS transistor 39 and the parasitic bipolar transistor 39a can be formed on the same semiconductor substrate 50. The charge/discharge control circuit 20B and the battery device 1B that require a space smaller than the space of a charge/discharge control circuit and battery device of the related art, can therefore be provided.

Further, the charge/discharge control circuit 20B that includes the NMOS transistor 39 and the parasitic bipolar transistor 39a as well as other components can be formed on the semiconductor substrate 50. The charge/discharge control circuit 20B and the battery device 1B that are more compact than a charge/discharge control circuit and battery device of the related art can therefore be provided.

The present invention is not limited to the above-mentioned embodiments, and can be carried out in various forms in addition to the examples described above in the stage of carrying out the invention, and various omissions, replacements, and alterations may be made thereto without departing from the gist of the invention.

For instance, although the bipolar transistor connected in parallel to the NMOS transistor 39 in the embodiments described above is the parasitic bipolar transistor 39a of the NMOS transistor 39, the bipolar transistor connected in parallel to the NMOS transistor 39 is not limited to the parasitic bipolar transistor 39a of the NMOS transistor 39. The bipolar transistor connected in parallel to the NMOS transistor 39 may be a bipolar transistor other than the parasitic bipolar transistor 39a of the NMOS transistor 39 as long as the connected bipolar transistor has the same connection configuration as that of the parasitic bipolar transistor 39a.

In the embodiments described above, separate control lines are provided for the level shifters 37 and 38, but the present invention is not limited thereto. The level shifters 37 and 38 may share a control line unless gate voltages of the PMOS transistors 33 and 34 need to be separately controlled.

Although the embodiments described above deal with the battery devices 1A and 1B in which the resistor 5 is connected between the VSS terminal 22 and the node N2, the resistor 5 may not always be connected between the VSS terminal 22 and the node N2 in the battery devices 1A and 1B. That is, the resistor 5 may be omitted from the battery devices of the embodiments.

In the battery devices 1A and 1B, the resistor 5 has the function of limiting a current that flows from the VSS terminal 22 to the voltage detection terminal 25 via the base-emitter diode of the parasitic bipolar transistor 39a in the reverse connection state. The resistor 5 may therefore be omitted in the battery devices 1A and 1B if the current flowing into the voltage detection terminal 25 via the base-emitter diode of the parasitic bipolar transistor 39a in the reverse connection state is within a tolerable range without the resistor 5.

The above-described embodiments and modifications thereof are encompassed in the scope and the gist of the invention, and are encompassed in the invention defined in claims and equivalents thereof.

What is claimed is:

1. A charge/discharge control circuit to be contained in a battery device including:
   a secondary cell;
   an external positive terminal and an external negative terminal to which a load, a positive pole of a charger, and a negative pole of the charger are connectable;
   a charge control FET configured to control charging of the secondary cell; and a discharge control FET configured to control discharging of the secondary cell, the charge/discharge control circuit comprising:
- a first power supply voltage input terminal to which, out of a first power supply voltage and a second power supply voltage, the first power supply voltage is supplied, the first power supply voltage and the second power supply voltage being generated by the secondary cell;
- a second power supply voltage input terminal to which the second power supply voltage lower than the first power supply voltage is supplied;
- a charge control terminal connected to a gate of the charge control FET;
- a discharge control terminal connected to a gate of the discharge control FET;
- a voltage detection terminal to which a voltage applied to the external positive terminal is supplied;
- an NMOS transistor configured to communicate the discharge control terminal and the voltage detection terminal; and
- a bipolar transistor having a collector connected to a drain of the NMOS transistor, an emitter connected to a source of the NMOS transistor, and a base connected to a bulk of the NMOS transistor and the second power supply voltage input terminal.

2. The charge/discharge control circuit according to claim 1, further comprising PMOS transistors configured to communicate the discharge control terminal and the voltage detection terminal through a path different from a path communicated by the NMOS transistors.

3. The charge/discharge control circuit according to claim 1, further comprising a booster circuit having an output terminal from which a voltage higher than the first power supply voltage is output,
wherein the NMOS transistor includes a gate connected to the output terminal of the booster circuit.

4. The charge/discharge control circuit according to claim 1, wherein the NMOS transistor and the bipolar transistor are formed of an NMOS transistor including a parasitic bipolar transistor.

5. The charge/discharge control circuit according to claim 2, wherein the NMOS transistor and the bipolar transistor are formed of an NMOS transistor including a parasitic bipolar transistor.

6. The charge/discharge control circuit according to claim 3, wherein the NMOS transistor and the bipolar transistor are formed of an NMOS transistor including a parasitic bipolar transistor.

7. The charge/discharge control circuit according to claim 1, wherein the charge/discharge control circuit is formed on a single semiconductor substrate.

8. The charge/discharge control circuit according to claim 2, wherein the charge/discharge control circuit is formed on a single semiconductor substrate.

9. The charge/discharge control circuit according to claim 3, wherein the charge/discharge control circuit is formed on a single semiconductor substrate.

10. The charge/discharge control circuit according to claim 4, wherein the charge/discharge control circuit is formed on a single semiconductor substrate.

11. The charge/discharge control circuit according to claim 5, wherein the charge/discharge control circuit is formed on a single semiconductor substrate.

12. The charge/discharge control circuit according to claim 6, wherein the charge/discharge control circuit is formed on a single semiconductor substrate.

13. A battery device comprising:
- the charge/discharge control circuit of claim 1;
- a secondary cell;
- an external negative terminal;
- an external positive terminal; and
- a charge control FET and a discharge control FET which are connected between a positive pole of the secondary cell and the external positive terminal.

* * * * *